UNITED STATES PATENT OFFICE.

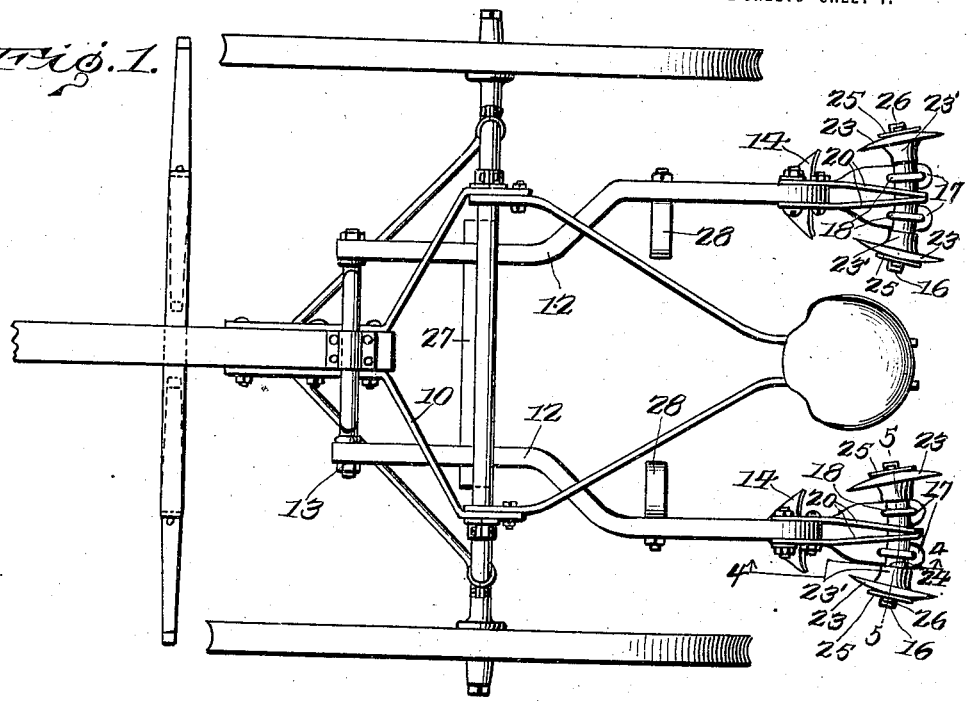
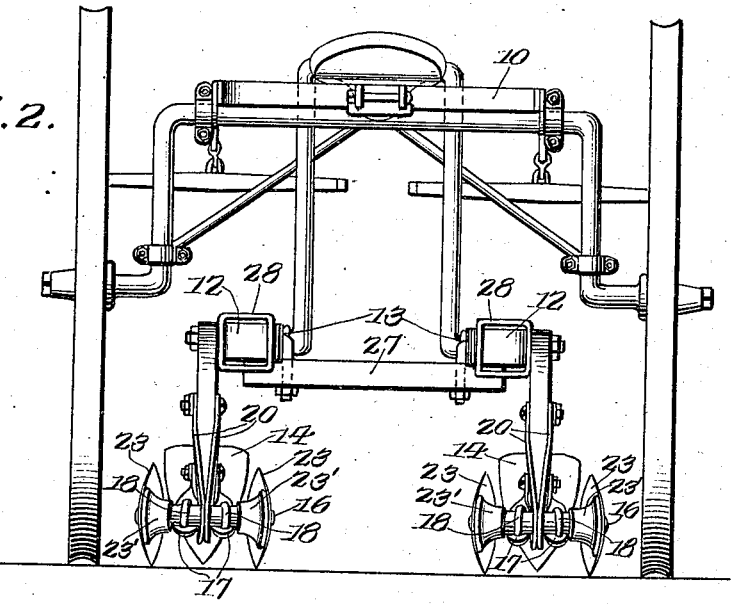

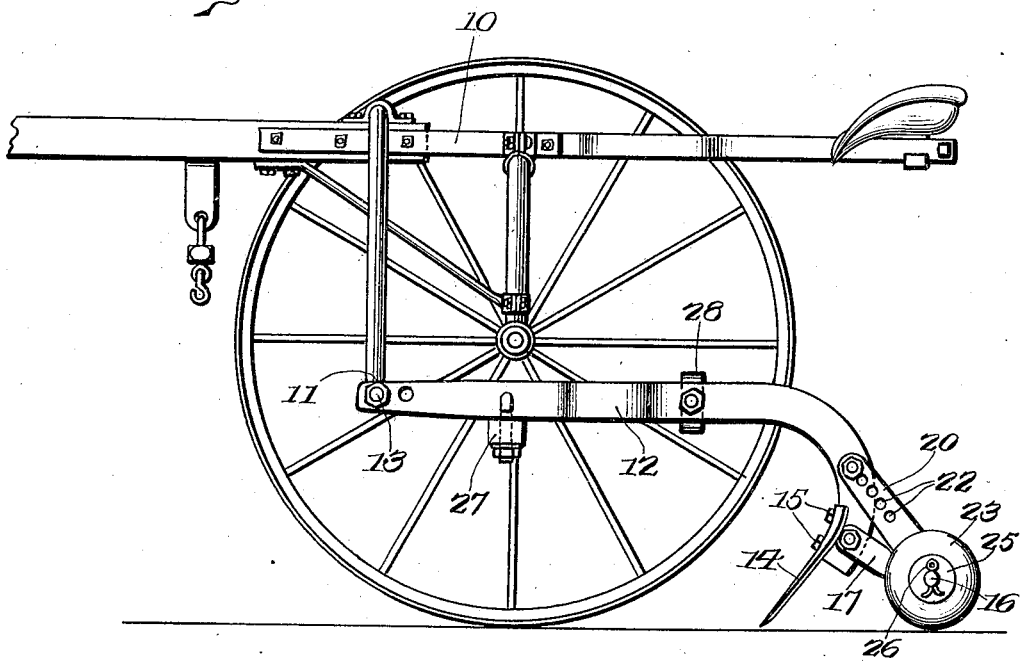
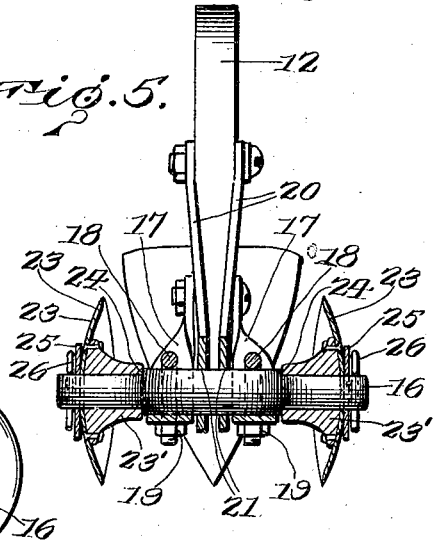

JOSEPH A. HARRIS, OF PALMYRA, NEBRASKA.

FURROW-OPENER.

1,390,437.　　　　Specification of Letters Patent.　　Patented Sept. 13, 1921.

Application filed February 28, 1921. Serial No. 448,742.

*To all whom it may concern:*

Be it known that I, JOSEPH A. HARRIS, a citizen of the United States, residing at Palmyra, in the county of Otoe, State of Nebraska, have invented certain new and useful Improvements in Furrow-openers; and I do hereby declare the following to be a full, clear, and exact description of the invention, such as will enable others skilled in the art to which it appertains to make and use the same.

This invention relates to new and useful improvements in agricultural machines, and particularly to machines for forming furrows preparatory to planting.

The principal object of the invention is to provide a device which is readily attachable to the ordinary one row cultivator frame, and by means of which the soil, after having been plowed, can be formed with furrows, and the soil in the furrows left loose and soft for easy opening when seed is deposited.

Another object is to provide a device of this character which is simple and cheap in its construction, and which can be readily attached to the ordinary cultivator frame, after the shovels and beams have been removed therefrom, the attachment being secured at the points and by the same means which held the cultivator beams.

Other objects and advantages will be apparent from the following description when taken in connection with the accompanying drawings.

In the drawings:

Figure 1 is a top plan view of a cultivator equipped with the improved attachment.

Fig. 2 is a rear elevation of the same.

Fig. 3 is a side elevation of the same.

Fig. 4 is a vertical longitudinal sectional view on the line 4—4 of Fig. 1, just inside of one of the disks enlarged.

Fig. 5 is an enlarged vertical sectional view on the irregular line 5—5 of Fig. 1, through the shaft and disks.

Referring particularly to the accompanying drawings, 10 represents the frame of a cultivator which has the usual swivels 11 to which are ordinarily connected the beams of the cultivator, not shown. Pivotally connected to said swivels 11 are the rearwardly extending beams 12, each of which is offset toward the outer side of the cultivator frame. To the downwardly turned rear end of each beam 12 is secured a furrow opening shovel 14, the same being secured to the front face of said portion by means of the bolts 15. Disposed rearwardly of the downwardly turned end of the beam 12, and extending transversely thereof, is the curved shaft 16, the outwardly bowed portion of which is directed rearwardly. Secured to the beam, and extending horizontally rearward therefrom, are the two brace arms 17, the same being twisted so that their rear ends lie in horizontal planes beneath the said curved shaft 16. U-bolts 18 are disposed over the shaft 16, and have their ends secured through the braces 17, by means of the nuts 19. Downwardly and rearwardly inclined braces 20 are secured to the beam above the braces 17, and have their rear ends formed with openings 21 through which the shaft 16 is disposed. The braces 20 are formed with series of openings 22 to permit adjustment on the beam, for the purpose of raising and lowering the shaft 16. The end portions of the shaft 16 are reduced to receive rotatably thereon the disks 23, the hubs 23' of which abut against the shoulders 24, formed by the reductions of the shaft ends. A washer 25 is disposed on each end of the shaft 16, outwardly of a disk, and through the shaft end is disposed a cotter pin 26. The disks are preferably concavo-convex with their convex faces directed outwardly, and by reason of the fact that the shaft 16 is curved, the disks stand vertically with respect to the ground and converge forwardly, as clearly seen in the top plan view, Fig. 1.

Connected to and extending between the beams 12, at points between their attachment to the swivels 11 and their offset portions, is a beam 27, which holds the beams 12 against individual movement either vertically or laterally, but provides that they swing vertically as a unit, on the said swivels. On one side of each of the beams 12 is secured a stirrup 28, for the foot of the driver of the machine, to serve as a foot-rest, and whereby he may place his weight on the beams to help maintain them in proper engagement in the soil.

In the operation of the device, the shovels dig out the soil to form the furrows, while the disks serve to cut the walls of the furrows and at the same time cut the swaths turned by the shovels, so that loose soil will be thrown into the furrows. This will be readily workable by the furrow openings of a planter, so that the usual difficulties will be overcome, and the planting rendered easy and quick.

What is claimed is:

1. A furrow forming device comprising a beam, a shovel on the beam, a transversely extending and rearwardly bowed shaft supported on the beam rearwardly of the shovel, and cutting disks on the ends of the shaft.

2. A furrow forming device comprising a beam, a shovel on the beam, a transverse shaft disposed behind the shovel and having its central part rearwardly bowed, rearwardly extending arms carried by the beam and clamped to the shaft, adjustable inclined braces carried by the beam and connected with the shaft, and disks on the ends of the shaft disposed in forwardly converging relation to each other.

In testimony whereof, I affix my signature, in the presence of two witnesses.

JOSEPH A. HARRIS.

Witnesses:
 FLOY SWEET.
 C. A. SWEET, JR.